June 12, 1962  E. ASCHERL  3,038,700
TRUCK TRAILER JACK
Filed Oct. 26, 1960  2 Sheets-Sheet 1
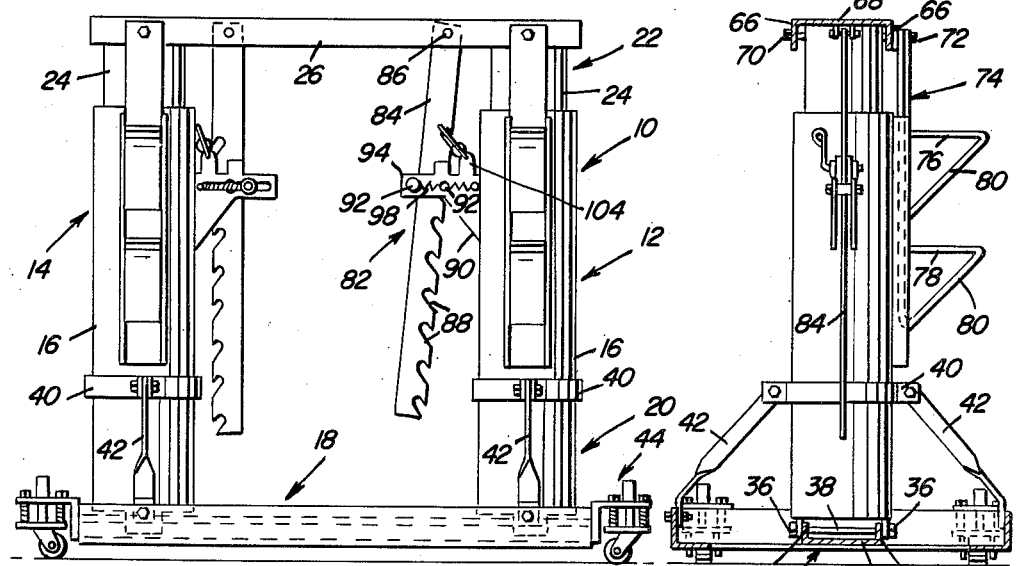
Fig.1
Fig.2
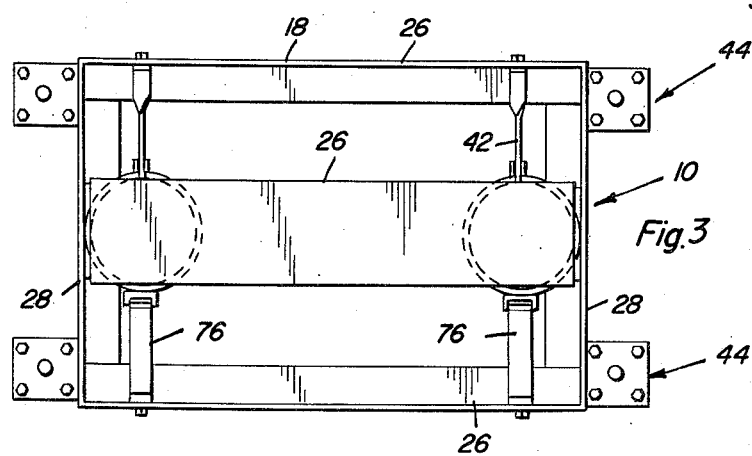
Fig.3
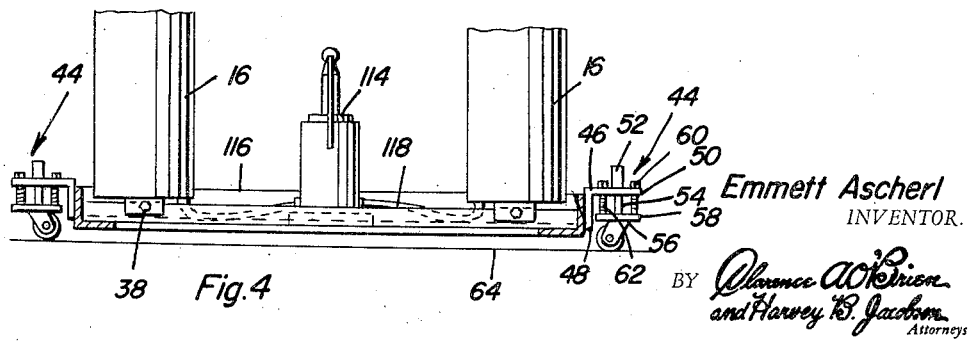
Fig.4
Emmett Ascherl
INVENTOR.

June 12, 1962  E. ASCHERL  3,038,700
TRUCK TRAILER JACK
Filed Oct. 26, 1960  2 Sheets-Sheet 2
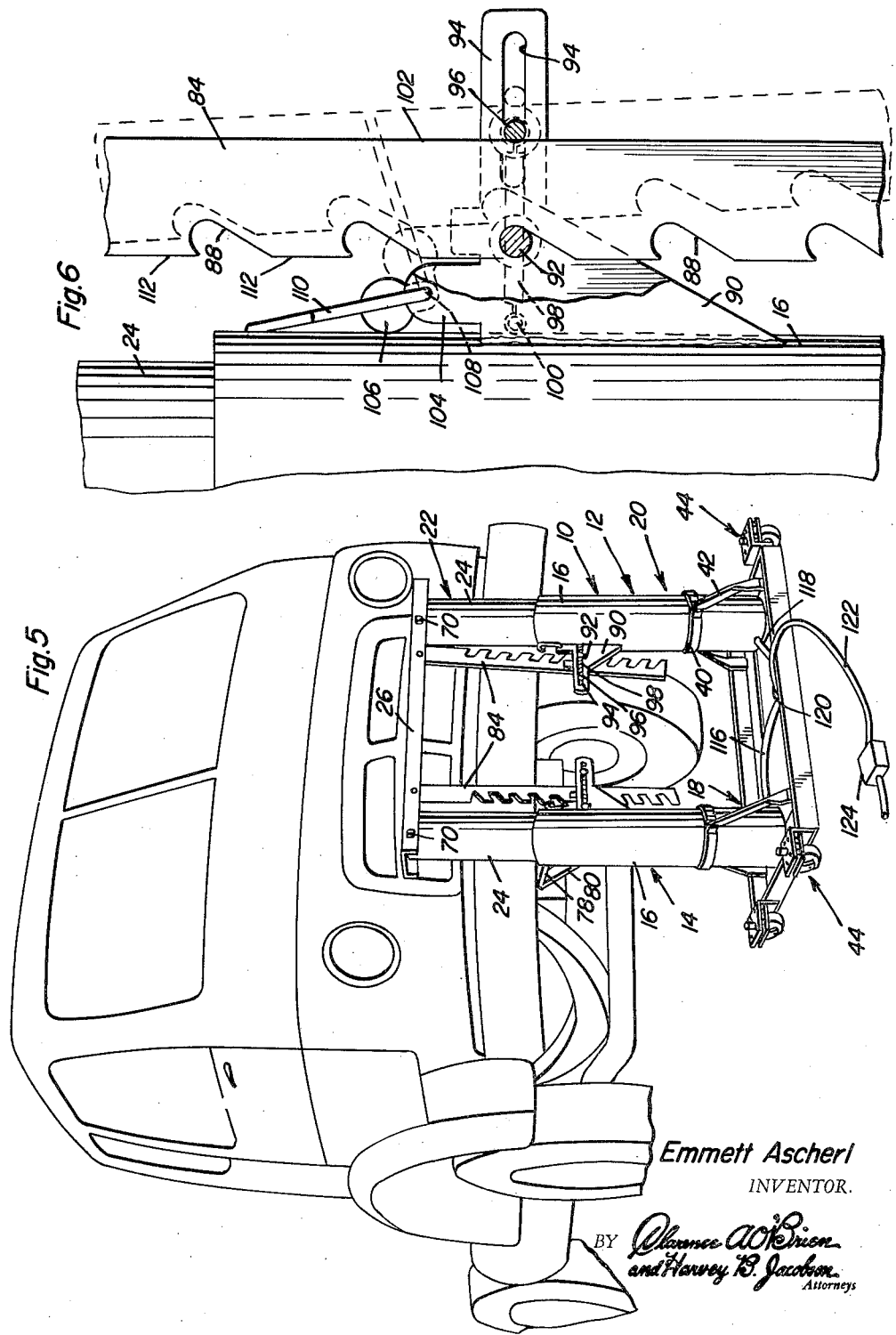
Emmett Ascherl
INVENTOR.

United States Patent Office 3,038,700
Patented June 12, 1962

3,038,700
TRUCK TRAILER JACK
Emmett Ascherl, Rte. 2, Fort Dodge, Iowa
Filed Oct. 26, 1960, Ser. No. 65,108
10 Claims. (Cl. 254—2)

This invention relates to a novel truck trailer jack assembly and more particularly to a jack assembly specifically adapted to lift a tractor or trailer of tractor-trailer vehicles.

The truck trailer jack of the instant invention has been primarily designed for use in maintenance shops which perform repair work on large trucks although it is to be noted that the truck trailer jack is of the extensible fluid motor type and may be actuated by a hand pump or air pressure from a supply tank in lieu of a source of fluid under pressure and trucks may be provided with suitable compartments for storing the jack assembly of the instant invention whereby the jack assembly may be utilized to make road repairs should it become necessary.

Although many types of vehicle jacks have heretofore been devised, the vehicle jack of the instant invention is specifically adapted to handle large trucks such as semi-trailer trucks and is provided with a safety latch mechanism for preventing accidental lowering of the jack.

The jack assembly of the instant invention includes a pair of spaced and generally parallel extensible fluid motors and the upper ends thereof are interconnected by means of a load beam. The jack assembly is provided with means for simultaneously extending each of the fluid motors and each fluid motor is provided with its own safety latch mechanism to prevent accidental lowering of that extensible motor whereby a double safety feature is provided greatly reducing any possibility of the entire jack assembly being accidentally lowered.

The main object of this invention is to provide a truck trailer jack assembly constructed in a manner whereby the jack assembly may be conveniently used to engage various parts of either the tractor or trailer of a semi-trailer vehicle in order to lift the same in order that repairs may be more readily made thereto.

A further object of this invention, in accordance with the immediately preceding object, is to provide the truck trailer jack assembly with a safety mechanism for preventing accidental lowering of the jack assembly, the jack assembly being provided with a pair of extensible fluid motors interconnected at their upper ends by means of a load beam and at their lower ends by means of a jack base and each provded with its individual safety latch mechanism.

Still another object of this invention is to provide a truck trailer jack assembly which will conform to conventional forms of manufacture, be of simple construction and easy to operate so as to provide a device that will be economically feasible, long lasting and readily adaptable to substantially every lifting requirement.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the truck trailer jack comprising the instant invention;

FIGURE 2 is a side elevational view of the jack assembly illustrated in FIGURE 1;

FIGURE 3 is a top plan view of the jack assembly illustrated in FIGURES 1 and 2;

FIGURE 4 is a longitudinal vertical sectional view of the lower assembly of the truck trailer jack illustrating the manner in which the extensible fluid motors are mounted upon the jack base and a modified form of the truck trailer jack utilizing a hand hydraulic pump for extending the extensible fluid motors of the jack assembly;

FIGURE 5 is a perspective view of the truck trailer jack shown being utilized to lift the front end of a tractor vehicle; and FIGURE 6 is a fragmentary enlarged longitudinal vertical sectional view taken substantially upon a plane passing through one of the safety latch assemblies and illustrating the manner in which the latch assembly may be utilized to prevent accidental lowering of the jack assembly and the manner in which the safety latch assembly may be rendered inoperative to prevent accidental lowering of the jack assembly.

Referring now more specifically to the drawings, the numeral 10 generally designates the jack assembly of the instant invention which includes a pair of extensible fluid motors generally designated by the reference numerals 12 and 14. Each of the fluid motors 12 and 14 includes a lower cylindrical member 16 secured at its lower end to the jack base generally referred to by the reference numeral 18. The cylindrical members 16 and the base 18 comprise the lower assembly of the jack 10 which is generally designated by the reference numeral 20. The upper assembly of the jack 10 is generally designated by the reference numeral 22 and includes a pair of upper piston members 24 whose upper ends are interconnected by means of a load beam 26.

The jack base 18 includes a generally rectangular open framework formed by a plurality of side and end angle members 26 and 28, respectively, interconnected at adjacent ends in any convenient manner. An upwardly opening channel member generally referred to by the reference numeral 30 is secured between the end members 28 and includes a pair of apertured upstanding legs interconnected by means of a bight portion 34. Each of the lower members 16 of the fluid motors 12 and 14 include a pair of spaced apertured mounting ears 36 which are registered with a corresponding pair of aligned apertures (not shown) formed in the channel member 30. A mounting bolt 38 is secured through the apertured ears 36 of each lower member 16 and the corresponding apertured portions of the legs 32 of the channel member 30. In this manner, each of the lower cylindrical members 16 are secured to the base 18. Each of the cylindrical base members 16 includes a clamp collar assembly 40 and each clamp collar assembly is provided with a pair of bracing arms 42 whose opposite ends are secured between diametrically opposite portions of the corresponding clamp collar 40 and adjacent portion of the side members 26. In this manner, the lower cylindrical members 16 of the extensible fluid motors 12 and 14 are rigidly secured in an upright position to the base 18.

The base 18 includes a plurality of dirigible wheel assemblies 44 which each include an angle mounting member 46 having its vertical flange 48 secured to one of the end members 28 in any convenient manner. The horizontal flange 50 includes a cylindrical sleeve 52 slidably receiving the shank 54 of the dirigible wheel member 56 which includes an apertured base plate 58 in which the lower ends of the threaded fasteners 60 are secured. The horizontal flange 46 is suitably apertured and slidably receives the fasteners 60 and a coil spring 62 is disposed about each of the fasteners 60 and between the confronting surfaces of the horizontal flange 46 and the mounting flange 58 whereby the dirigible wheel member 56 is yieldingly mounted for limited vertical movement relative to the base 18. It is to be understood that the coil springs 62 bias the dirigible wheel members 56 downwardly with sufficient force to support the jack 10 when the latter is not being used to lift a heavy object. However, when the jack is utilized to lift a heavy object, the coil springs 62 will be compressed so that the lower surfaces of the side and end members 26 and 28 will engage the supporting surface 64 over which the jack 10 is positioned.

The load beam 26 includes a downwardly opening channel member including a pair of depending sides 66 and an interconnecting bight portion 68 which abuts the flat upper ends of the pistons 24. The load beam 26 is secured to the upper ends of the pistons 24 by means of suitable fasteners 70 and 72 which are passed through suitable apertures formed in the legs 66 and threadedly engaged in suitable threaded bores (not shown) formed in the pistons 24. The fastener 72 is longer than the fastener 70 and is also utilized to secure the upper end of a vertically disposed support member generally referred to by the reference numeral 74 to the load beam 26. Each of the extensible fluid motors 12 and 14 is provided with a support member 74 and each support member 74 includes a pair of vertically spaced, laterally projecting and horizontally disposed lift shoe members 76 and 78 adapted to be positioned beneath a member to be lifted. Each of the shoe members 76 and 78 includes a bracing element 80 secured between the outer free end of the corresponding shoe and a point on the support member 74 spaced vertically therebelow.

Each of the extensible fluid motors 12 and 14 is provided with a latch means generally designated by the reference numeral 82 which includes a first elongated latch member 84 pivoted at its upper end to the load beam 26 by means of a suitable transverse pivot pin 86. The first latch member 84 is provided with a plurality of vertically spaced inclined and downwardly opening notches 88 opening toward the corresponding extensible fluid motor. The second latch member of each of the extensible fluid motors 12 and 14 includes a pair of generally parallel, vertically extending and outwardly projecting mounting lugs 90 between which a horizontal latch member pin 92 is secured a spaced distance from the corresponding lower cylindrical member 16. The horizontal latch member pin 92 is selectively engageable in the notches 88 and each of the mounting lugs 90 is provided with a horizontally disposed portion 94 having a horizontal slot 95 formed therein in which the one end of a transverse pin 96 is slidably received. In this manner, the opposite ends of the transverse pin 96 are slidably received in the slots 95. A pair of expansion springs 98 are secured at their outer ends to the extremities of the transverse pin 96 and at their inner ends to a suitable fastener 100 carried by the corresponding mounting lug 90. The latch member 84 of each latch assembly 82 is received between a horizontal latch member pin 92 and the transverse pin 96 between the corresponding pair of horizontal portions 94. In this manner, the transverse pin 96 engages the vertical edge 102 of the corresponding elongated first latch member 84 remote from the corresponding fluid motor and urges the first latch member 84 inwardly toward the horizontal latch member pin 92 whereby the latter may be seatingly received within one of the downwardly opening notches 88 formed in the first latch member 84 upon downward movement of the load beam 26 relative to the base 18. However, each of the mounting lugs 90 includes an upstanding apertured mounting ear 104. An abutment member 106 is eccentrically mounted on a pin extending through the aligned apertures formed in the ears 104 and the pin 108 is provided with a crank arm 110 for effecting horizontal displacement of the abutment member 106 upon rotation of the pin 108. With attention directed to FIGURE 6 of the drawings it will be noted that the abutment member 106 is shown in a retracted position in solid lines and in an extended position in phantom lines. When in the extended position, the abutment 106 engages the vertical edges 112 of the first elongated latch member 84 disposed between the notches 88 whereby the first latch member 84 is urged outwardly away from the corresponding extensible motor so as to prevent the horizontal latch pin member from becoming seated within the notches 88. However, it is to be noted that the abutment member 106 is spaced vertically above the horizontal latch pin member 92 a distance enabling the abutment member 106 to engage one of the surfaces 112 while a notch 88 is horizontally aligned with the horizontal latch member pin 92. When a notch 88 is horizontally aligned with the abutment member 106, the horizontal latch member pin 92 is horizontally aligned with one of the surfaces 112 and thereby maintains the elongated first latch member 84 in an outwardly pivoted position preventing the abutment member 106 from seating within one of the notches 88. It will therefore be appreciated that when the abutment member 106 is in the extended position spaced outwardly of the corresponding fluid motor, the abutment member 106 and the horizontal latch member pin 92 will alternately engage the surfaces 112 of the elongated first latch member 84 to maintain the latter in an outwardly pivoted inoperational position.

It may be observed from FIGURES 4 and 5 of the drawings that the jack 10 may be operated either by means of a source of compressed air or by a suitable hydraulic jack and with attention now directed to FIGURES 4 and 5 of the drawings that a single manually operated hydraulic pump assembly 114 may be operatively connected to the extensible fluid motors 12 and 14 by means of suitable conduits 116 and 118 for actuating the jack 10. It is to be noted that the pump assembly 114 will be provided with suitable valve means for lowering the upper assembly 22 as desired. In FIGURE 5 of the drawings it will be noted that the conduits 116 and 118 are connected to a junction assembly 120 having a single conduit 122 leading therefrom which may be connected at its free end to a suitable compressed air supply for operating the jack 10. In order to facilitate the raising and lowering of the jack 10 a suitable valve assembly 124 may be interposed in the conduit 122 for stopping the flow of compressed air to the jack 10 and preventing the compressed air within the extensible motors 12 and 14 of the jack 10 to escape into the ambient atmosphere in order to lower the upper assembly 22 of the jack 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A truck trailer jack assembly comprising a base, at least one extensible motor, said extensible motor including upper and lower assemblies, said lower assembly including an upstanding lower member secured to said base, said upper assembly including a movable upper member slidably mounted on said lower member, means for raising and lowering said upper member relative to said lower member, support means carried by said upper member for supporting a member being lifted by said jack assembly, and latch means carried by said upper assembly and engageable with said lower assembly for preventing accidental lowering of said upper member relative to said lower member, said latch means including a first elongated latch member pivoted at its upper end to said upper assembly and normally disposed vertically along side said upper and lower members, a second latch member carried by said lower assembly and engageable by said first latch member, one of said latch members including a plurality of inclined notches opening downwardly and toward the other latch member spaced vertically therealong, the other latch member including a horizontal latch member receivable in said notches and means engaged with and resiliently urging said one latch member toward said other latch member, and retractable abutment means carried by said other latch member selectively engaging the adjacent vertical edge of said one latch member between said notches for pivoting said first latch member outwardly away from said second latch member, said retractable abutment means and said horizontal latch member being carried by said second latch member and vertically spaced from each other as to alternately engage said vertical edges of said one latch member between said notches.

2. The combination of claim 1 wherein said base includes two parallel extensible motors, and a load beam interconnected between said upper members.

3. The combination of claim 2 wherein said latch means includes two elongated first latch members each pivoted at its upper end to said load beam adjacent one of said upper members, each of said lower members including one of said second latch members engageable with the corresponding first latch members.

4. The combination of claim 1 wherein said base includes two parallel extensible motors, a load beam interconnected between said upper members, and means for simultaneously extending said extensible motors.

5. The combination of claim 1 wherein said base includes a plurality of resiliently mounted dirigible wheels normally urged to a position projecting below said base when supporting the weight of the jack assembly alone and movable upwardly relative to said base to enable said base to engage the supporting surface for said jack when weight is being lifted by said jack assembly.

6. The combination of claim 1 wherein said support means includes a vertically disposed support member secured at the upper end to said upper assembly and adapted at the lower end to slidably engage said lower member, and said support member includes a plurality of vertically spaced, laterally projecting and horizontally disposed lift shoes.

7. The combination of claim 6 wherein each of said shoes includes inclined bracing elements extending between the outer end thereof and a point on said support member spaced vertically therebelow.

8. The combination of claim 1 wherein said one latch member comprises said first latch member and said second latch member includes a pair of generally parallel, vertically extending and outwardly projecting mounting lugs carried by said lower member, said horizontal latch member being secured between the free end portions of said mounting lugs.

9. A truck trailer jack assembly comprising a base, at least one extensible motor, said extensible motor including upper and lower assemblies, said lower assembly including an upstanding lower member secured to said base, said upper assembly including a movable upper member slidably mounted on said lower member, means for raising and lowering said upper member relative to said lower member, support means carried by said upper member for supporting a member being lifted by said jack assembly, and latch means carried by said upper assembly and engageable with said lower assembly for preventing accidental lowering of said upper member relative to said lower member, said latch means including a first elongated latch member pivoted at its upper end to said upper assembly and normally disposed vertically alongside said upper and lower members, a second latch member carried by said lower assembly and engageable by said first latch member, one of said latch members including a plurality of inclined notches opening downwardly and toward the other latch member spaced vertically therealong, the other latch member including a horizontal latch member receivable in said notches and means engaged with and resiliently urging said one latch member toward said other latch member, and retractable abutment means carried by said other latch member selectively engaging the adjacent vertical edge of said one latch member between said notches for pivoting said first latch member outwardly away from the second latch member.

10. A jack assembly comprising upper and lower members mounted for relative movement, latch means carried by said upper member and engageable with said lower member for preventing accidental lowering of said upper member relative to said lower member, said latch means including a first elongated latch member pivoted at its upper end to said upper member and normally disposed vertically alongside said upper and lower members, a second latch member carried by said lower assembly and engageable by said first latch member, one of said latch members including a plurality of inclined notches opening toward the one of said upper and lower members to which the other latch member is secured and being spaced vertically along said one latch member, the other latch member including a horizontal latch member receivable in said notches and means engaged with and resiliently urging said one latch member towards said other latch member, and retractable abutment means carried by said other latch member selectively engaging the adjacent vertical edge of said one latch member between said notches for pivoting said first latch member outwardly away from said second latch member, said retractable abutment and said horizontal latch member being carried by said second latch member and vertically spaced from each other so as to alternately engage said vertical edges of said one latch member between said notches.

References Cited in the file of this patent
UNITED STATES PATENTS

| | | |
|---|---|---|
| 257,619 | Silver | May 9, 1882 |
| 974,287 | May | Nov. 1, 1910 |
| 2,754,108 | Brown | July 10, 1956 |
| 2,867,409 | Southerwick | Jan. 6, 1959 |